US012320380B1

(12) United States Patent
Dault (10) Patent No.: US 12,320,380 B1
(45) Date of Patent: *Jun. 3, 2025

(54) ATTACHABLE EQUIPMENT HANGER

(71) Applicant: David P. Dault, Grand Rapids, MI (US)

(72) Inventor: David P. Dault, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,302

(22) Filed: Mar. 22, 2024

Related U.S. Application Data (63) Continuation of application No. 17/829,923, filed on Jun. 1, 2022, now Pat. No. 11,940,001.

(60) Provisional application No. 63/305,921, filed on Feb. 2, 2022, provisional application No. 63/196,949, filed on Jun. 4, 2021.

(51) Int. Cl.
*F16M 13/02* (2006.01)
*F16B 45/00* (2006.01)

(52) U.S. Cl.
CPC ............. *F16B 45/00* (2013.01); *F16M 13/02* (2013.01)

(58) Field of Classification Search
CPC ...... A47F 5/0006; A47F 7/0021; F16M 13/02
USPC .................. 248/111, 690, 692, 339
See application file for complete search history.

(56) References Cited

U.S. PATENT DOCUMENTS

| | | | |
|---|---|---|---|
| 1,050,112 A | 1/1913 | Douglas | |
| 2,212,049 A | 8/1940 | Ryland et al. | |
| 3,468,508 A | 9/1969 | Huver | |
| 3,495,797 A | 2/1970 | Ganz | |
| 3,556,454 A | 1/1971 | Huver | |
| 3,620,493 A | 11/1971 | Huver | |
| 4,747,519 A | 5/1988 | Green et al. | |
| 7,568,673 B2 | 8/2009 | Evingson | |
| 7,703,735 B2 | 4/2010 | Fryer et al. | |
| 7,775,491 B1 | 8/2010 | Samu | |
| 8,833,717 B1 | 9/2014 | Holmes | |
| 11,187,375 B2 | 11/2021 | Lyon | |
| 11,940,001 B1 * | 3/2024 | Dault | F16B 45/00 |

OTHER PUBLICATIONS

Screenshots from www.printables.com/model/10434-stihl-kombi-system-attachment-hanger, understood to have been publicly available prior to Jun. 4, 2021.

* cited by examiner

*Primary Examiner* — Bradley Duckworth
(74) *Attorney, Agent, or Firm* — Gardner, Linn, Burkhart & Ondersma LLP (57) ABSTRACT

An attachable hanger for hanging equipment includes a body defining a receiving cavity and a coupling portion. An end portion or an end of a shaft can be inserted into the receiving cavity while a projection of the shaft is coupled to the attachable hanger via the coupling portion. A hanger portion is connected to the body to allow the attachable hanger to be suspended from an elevated object, such as a wall hook or rail. Optionally, the coupling portion may include a securing slot and a coupler through-hole, each adapted to selectively attach the attachable hanger to a variety of equipment shafts having various connecting and alignment features.

23 Claims, 13 Drawing Sheets

ATTACHABLE EQUIPMENT HANGER

CROSS REFERENCE TO RELATED APPLICATION

The present application is a continuation of U.S. patent application Ser. No. 17/829,923 filed on Jun. 1, 2022, now U.S. Pat. No. 11,940,001, which claims priority of U.S. provisional application Ser. No. 63/196,949, filed Jun. 4, 2021, and 63/305,921 filed on Feb. 2, 2022, which are both hereby incorporated herein by reference in their entireties.

FIELD OF THE INVENTION

The present invention relates generally to an attachable equipment hanger adapted to store equipment by selectively coupling to and hanging equipment, particularly equipment pre-equipped with connecting and alignment features.

BACKGROUND OF THE INVENTION

Many forms of equipment are designed to be interchangeable with and attachable to other equipment. For example, a weed trimmer attachment may be selectively attached to and powered by a power source, such as a gas-powered or battery-powered motor. The same power source can also be attached to and used to power an edger attachment, or numerous other functional attachments. Connecting and alignment features, such as lugs, raised screw heads, or spring buttons, are built into portions of the attachable equipment to enable the equipment to be selectively attached and detached to other pieces of equipment. When not in use, the attachable equipment can be stored.

SUMMARY OF THE INVENTION

The attachable equipment hanger of the present invention is adapted to be coupled to a piece of attachable equipment, such as a weed trimmer attachment, and suspended from an elevated object such as a wall hook or a rail. The attachable hanger has an open hook portion and a closed hook portion to allow the attachable hanger to be suspended from a variety of different objects according to a user's preferences or needs. A body defines a coupling portion that is adapted to be coupled to existing connecting and alignment features, such as lugs, raised screw heads, or spring buttons, commonly found on equipment designed for attachment and detachment to other similar equipment.

According to one form of the invention, an attachable hanger includes a body defining a receiving cavity adapted to receive an end portion of a shaft of a piece of equipment, and a coupling portion that can be coupled to a projection from the shaft of the piece of equipment. A hanger portion is connected to the body for suspending the attachable hanger from an elevated object.

In one aspect, the coupling portion includes a securing slot adapted to selectively receive the projection to selectively hold the piece of equipment when the hanger portion is suspended from the elevated object.

In another aspect, the coupling portion further includes a coupler through-hole adapted to selectively receive a resilient member projection, such as a spring button or a raised screw head, to selectively secure the piece of equipment to the attachable hanger.

In yet another aspect, the body includes a receiving channel that the projection may slide through. The securing slot may receive the projection after the projection has slid through the receiving channel and has been rotated out of alignment with the receiving channel.

In still another aspect, the hanger portion includes a hanging arm extending above an upper surface of the body and that has a proximal end connected to the body, and a distal end disconnected from the body. The hanging arm may optionally have a continuous and constant circular curvature. Additionally, both the proximal and distal ends may be located below the upper surface of the body. Optionally, the hanger portion may include a supportive arm extending between the body and a middle portion of the hanging arm to form a closed hook portion.

According to another form of the invention, an attachable hanger includes a body defining a through-hole adapted to selectively receive an end portion of a shaft of a piece of equipment, and a receptacle adapted to selectively receive a projection from the shaft to selectively hold the piece of equipment. An extension arm extends between the body and a hanger portion, where the hanger portion is adapted to suspend the attachable hanger from an elevated object.

In one aspect, the attachable hanger includes an additional extension arm extending between the body and the hanger portion.

In another aspect, the hanger portion includes a hanging arm that extends furthest away from the body in a longitudinal direction at a location that is aligned with a longitudinal axis of the body.

Thus, the attachable equipment hanger of the present invention allows a user to easily and conveniently store equipment by selectively attaching and detaching the equipment to the attachable hanger either before or after the hanger is suspended from an elevated location. The hanger portion has open and closed hook portions to allow for greater flexibility when hanging the attachable hanger. The coupling portion has multiple adaptations to allow various types of connecting and alignment features pre-equipped on the equipment to be coupled to the attachable hanger.

These and other objects, advantages, purposes and features of the present invention will become apparent upon review of the following specification in conjunction with the drawings.

DESCRIPTION OF THE PREFERRED EMBODIMENTS

Figure 1:
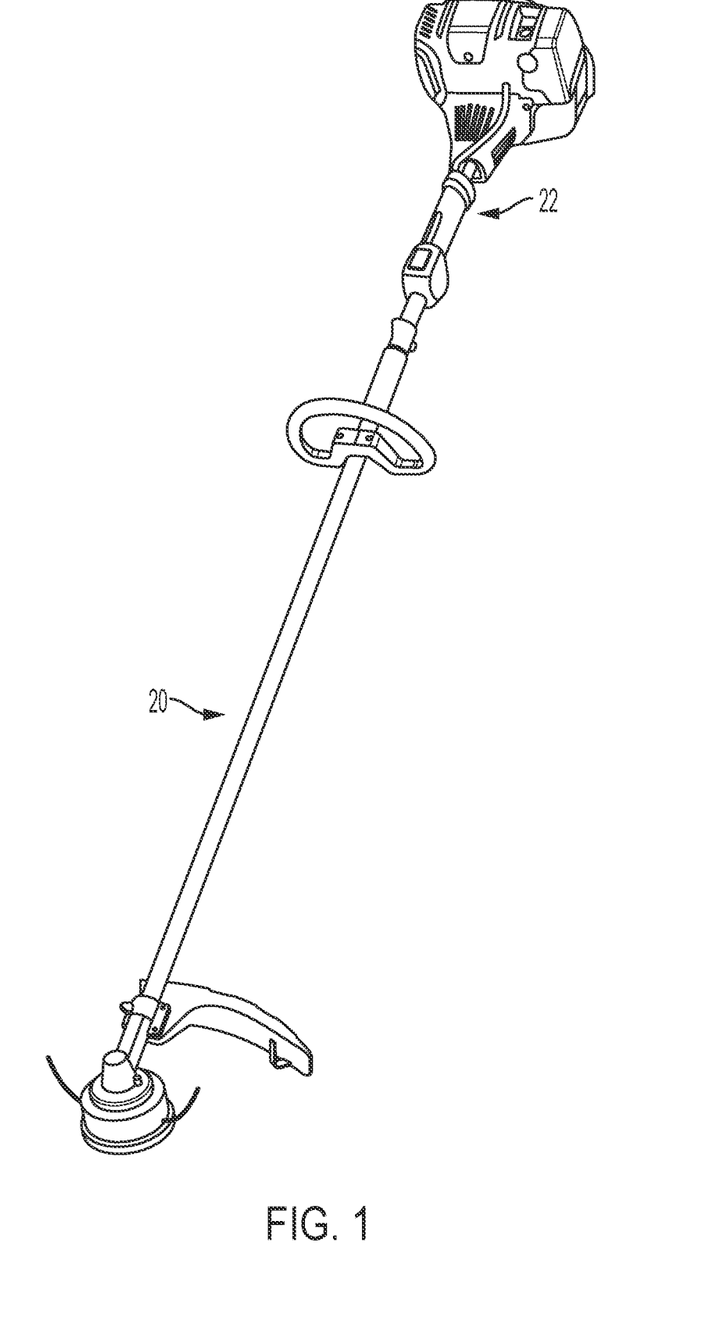
FIG. 1 is a perspective view of a power tool configured as a weed trimmer lawn and garden tool comprising a trimmer attachment attached to a power source.
Figure 2:
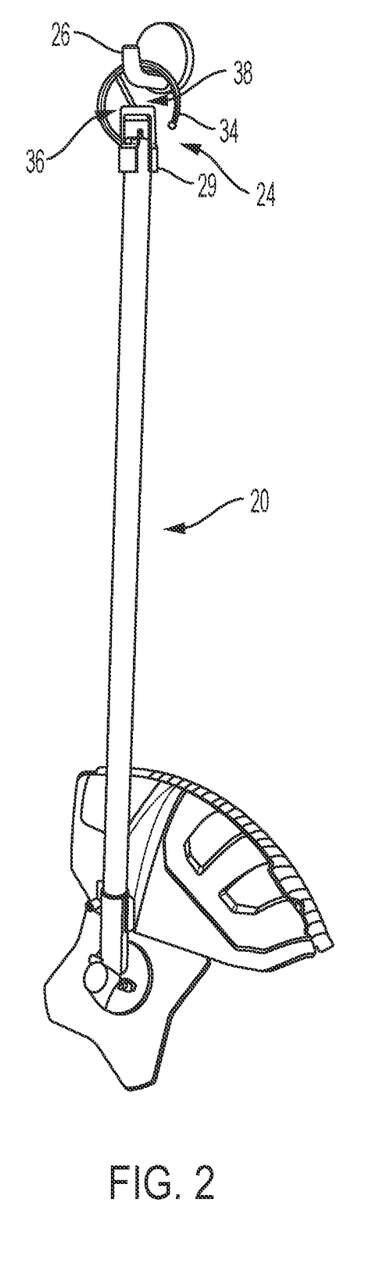
FIG. 2 is a perspective view of the weed trimmer attachment of FIG. 1, shown detached from the power source and coupled to an attachable hanger, wherein the attachable hanger is hanging from an open hook via an open hook portion.

The present invention will now be described with reference to the accompanying figures, wherein the numbered elements in the following written description correspond to like-numbered elements in the figures. As discussed in detail below, the present invention is directed to embodiments of an attachable hanger that may be used with power tools, such as lawn and garden equipment, to hang attachment accessories of such equipment for storage when disconnected from their power source. A functional attachment accessory in the form of a weed trimmer attachment 20 is shown attached to a power source or drive unit 22 in FIG. 1. Weed trimmer attachment 20 may be selectively attached to power source for use as a lawn and garden trimmer, and detached from power source 22 to enable another functional attachment accessory serving a different purpose, such as a hedge trimmer attachment or an edger attachment, to be attached to power source 22 for use. When weed trimmer attachment 20 is detached from power source 22, it may be conveniently stored by connecting it to an attachable equipment hanger 24 either before or after attachable hanger 24 is suspended from a hanging device or other elevated object, such as a hook 26 as shown in FIG. 2. As discussed in more detail below, it should be appreciated that the attachable hanger device of the present invention may be used with a wide variety of accessories to store such accessories when the accessories are not in use and connected to a power source.

Referring now to FIGS. 3-7 depicting a preferred embodiment, an attachable hanger 24 includes a hanger portion 28 connected to a cylindrical body 29. Hanger portion 28 further includes a supportive arm or a straight arm 32 and a hanging arm or curved arm 34 that define a closed hook portion 36 and an open hook portion 38. A lower end 32a of straight arm 32 is connected to an upper surface 29a of body 29. An upper end 32b of straight arm 32 is connected to a middle portion 34b of curved arm 34. Curved arm 34 extends above upper surface 29a of body 29. A proximal end 34a of curved arm 34 is connected to body 29 of attachable hanger 24. A distal end 34c of curved arm 34 terminates in a bulge 42 at a location that is laterally outboard of the outer circumference of body 29 and below upper surface 29a of body 29 in a longitudinal direction. A series of webbings 44 and ribs 45 (FIG. 6) provide additional structural support to attachable hanger 24. Additional longitudinal ribs 47 are included on the internal generally cylindrical wall of a receiving portion in the form of cylindrical receiving cavity 46 so as to make contact with an end portion of an attachable shaft when the shaft is inserted into receiving cavity 46, thereby creating a tighter and more secure fit between the attachable shaft and attachable hanger 24. Internal ribs 47 are configured in a generally similar manner to ribs 45. As will be discussed below, a receiving portion may take other forms, such as a through-hole that extends through a body.

In the preferred embodiment, attachable hanger 24 is made of polycarbonate or any other suitable plastic material such as a semi-flexible and/or non-rigid plastic. This allows certain portions of attachable hanger 24 to flex and bend when desired, without breaking, while other portions remain substantially rigid. For example, a small force can be applied to distal end 34c of curved arm 34 to selectively flex and temporarily increase or decrease an inlet distance—the distance between bulge 42 and body 29—relative to the default inlet distance when no force is being applied to distal end 34c. This enables an object, such as horizontal rod with a cross sectional area greater than the default inlet distance, the ability to pass between bulge 42 and body 29 and into open hook portion 38. Once the rod is in open hook position 38, the force used to flex distal end 34c can be discontinued to return the inlet distance back to the smaller default inlet distance. In this scenario, the rod will remain secured in open hook position 38 until sufficient force is applied to distal end 34c to once again increase the inlet distance enough to allow passage of the rod out of open hook position 38. In this way, the likelihood of an inadvertent release of attachable hanger 24 from the hanging position is reduced, as a specific force vector must be applied to distal end 34c to allow passage of the rod out of open hook position 38. Additionally, bulge 42 slightly increases the inlet distance necessary to allow passage of an object or horizontal rod out of open hook position 38 to further reduce the risk of attachable hanger 24 being released from the hanging position.

Figure 6:
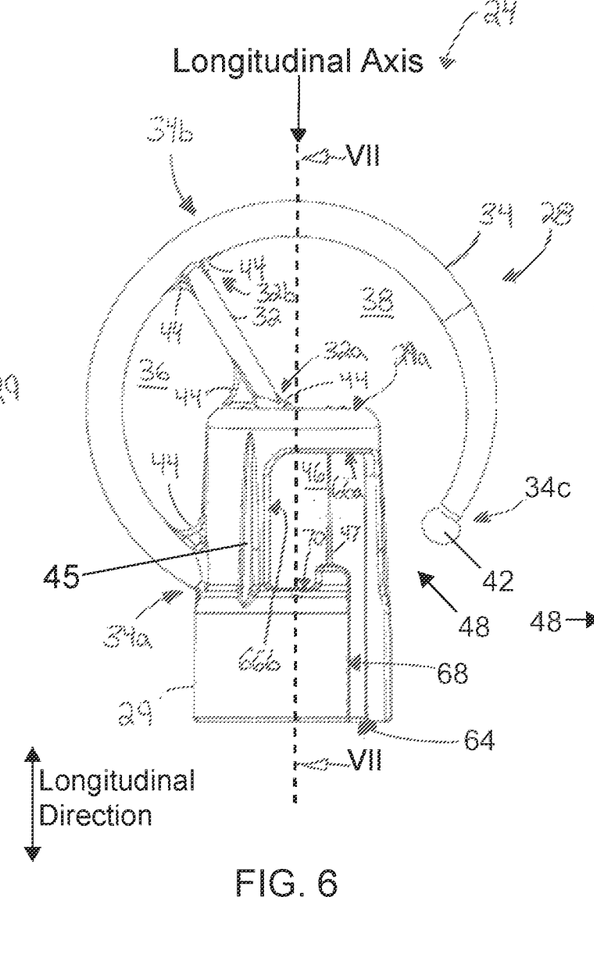
FIG. 6 is a side elevation view of the attachable hanger of FIG. 2.

The curved circular geometry of curved arm 34 in conjunction with the position of the center of gravity of attachable hanger 24 further reduces the risk of the inadvertent release of attachable hanger 24 from the hanging position. Specifically, the geometry of curved arm 34 is such that the location at which curved arm 34 extends furthest away from body 29 in the longitudinal direction is aligned with a longitudinal axis of body 29 (FIG. 6). Due to these characteristics, an object passing through open hook portion 38, such as hook 26, will naturally slide unimpeded and come to rest near the top inner surface of curved arm 34. (FIG. 2). Because curved arm 34 further extends and curves downward near distal end 34c, the outlet of open hook portion 38 is located at a considerably lower position relative to the resting position of hook 26. Therefore, attachable hanger 24 must be lifted and/or rotated to allow hook 26 passage out of open hook portion 38 to thereby release attachable hanger 24 from the hanging position.

Closed hook portion 36 is a closed loop formed by portions of straight arm 32, curved arm 34, and body 29. Attachable hanger 24 can be hung on open hook 26 by passing an open end of open hook 26 through closed hook portion 36. Once open hook 26 is within closed hook portion 36, an upward vertical force must be applied to attachable hanger 24 to free open hook 26 from closed hook portion 36 and thereby release attachable hanger 24 from open hook 26. Therefore, similar to open hook portion 38, the likelihood of an inadvertent release of attachable hanger 24 from the hanging position is greatly reduced, as a specific force vector must be applied to attachable hanger 24 to free open hook 26 from closed hook portion 36.

Figure 3:
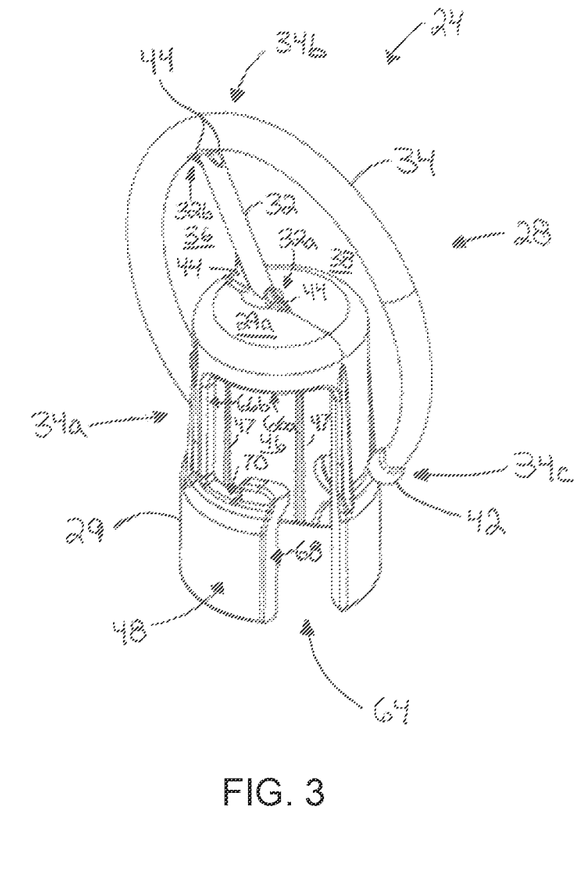
FIG. 3 is a perspective view of the attachable hanger of FIG. 2.
Figure 4:
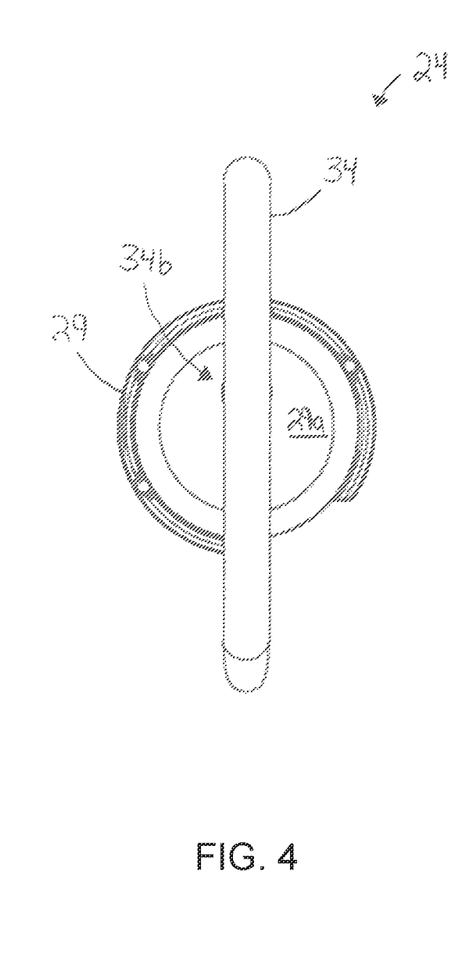
FIG. 4 is a top plan view of the attachable hanger of FIG. 2.
Figure 5:
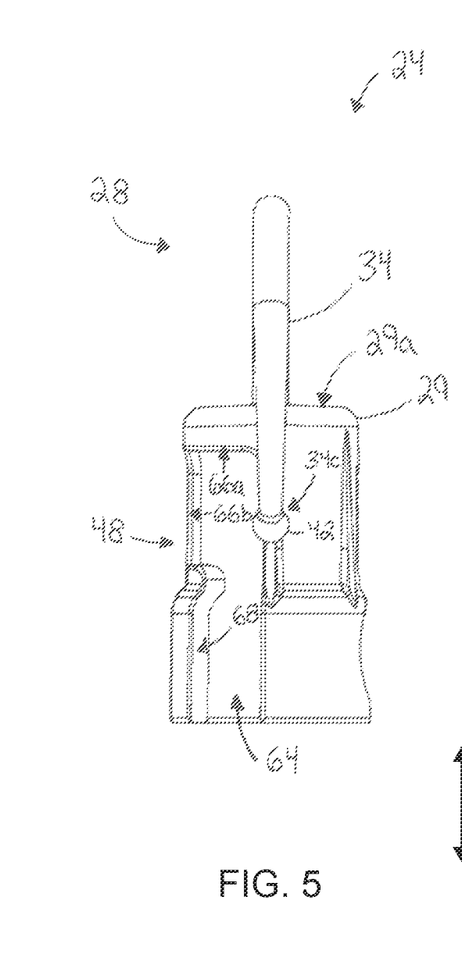
FIG. 5 is a side elevation view of the attachable hanger of FIG. 2.
Figure 7:
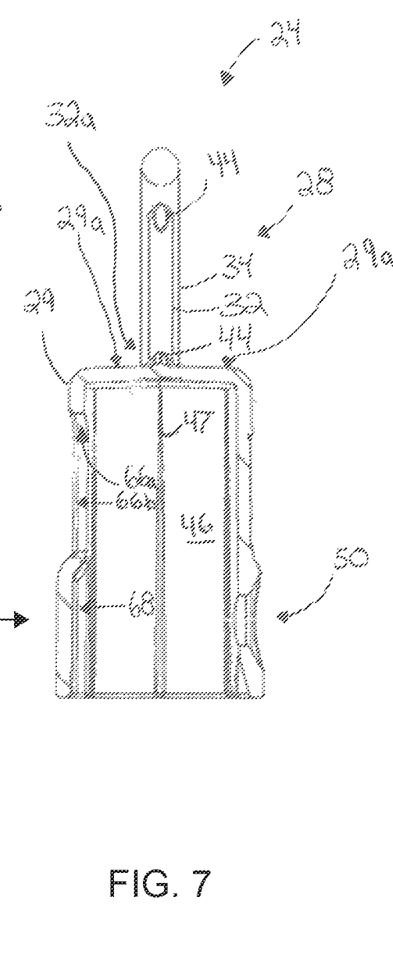
FIG. 7 is a cross-sectional view of the attachable hanger of FIG. 2 at the plane designated VII in FIG. 6.

Referring to FIGS. 3 and 7, attachable hanger 24 can be coupled to an end portion of an attachable shaft of a piece of equipment. Body 29 defines cylindrical receiving cavity 46, and a coupling portion which includes one or more receptacles such as a lug coupler 48 and a coupler through-hole 50 in the preferred embodiment. Through these features, attachable hanger 24 is able to accommodate (couple to) a wide variety of different equipment shafts using the existing projections or connecting and alignment features of the shafts that otherwise enable the shafts to be connected to another piece of equipment, such as power source attachment 22.

For example, FIGS. 11A-11D depict a shaft 52 that can connect to another piece of equipment via a long lug connector 54. Long lug connector 54 includes an annular end-ring 56 that can be secured to the end of shaft 52 without obstructing or interfering with power transmission rod 58. Once shaft 52 is connected to a power source attachment, such as power source attachment 22 (FIG. 1), transmission rod 58 can transfer power from power source attachment 22 to a functional attachment, such as a weed trimmer attachment 20. Long lug connector 54 also includes projection or a long lug 60 that is integrally formed with end-ring 56. Additionally, shaft 52 has a tapered shaft lug 62 that is aligned with and spaced from long lug 60.

Figure 8A:
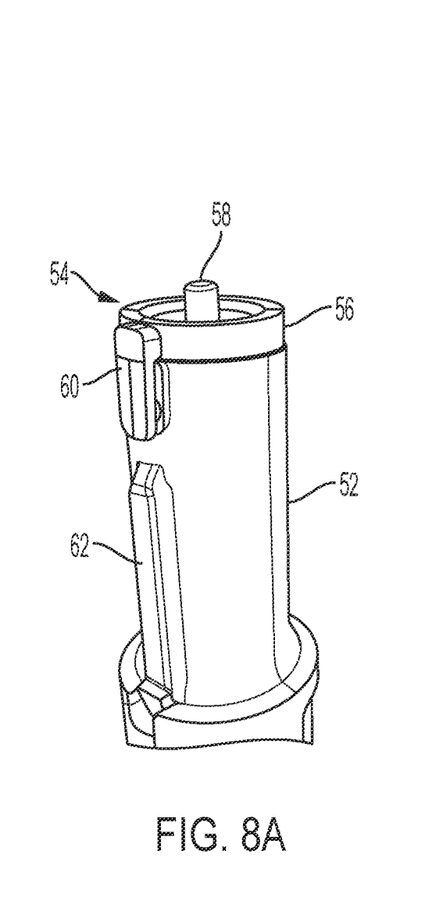
FIG. 8A is a perspective view of a long lug connector fixed to an end portion of an attachable shaft.
Figure 8B:
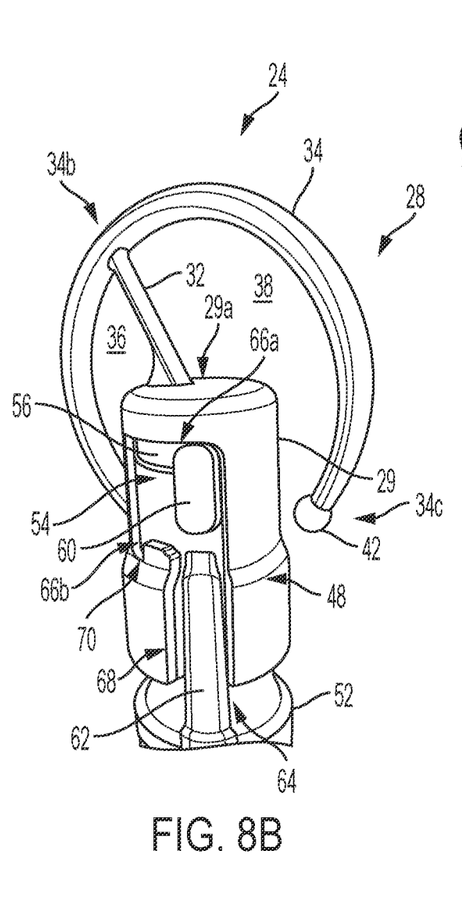
FIG. 8B is a perspective view of the end portion of the attachable shaft of FIG. 8A inserted into a receiving cavity of the attachable hanger of FIG. 2.
Figure 8C:
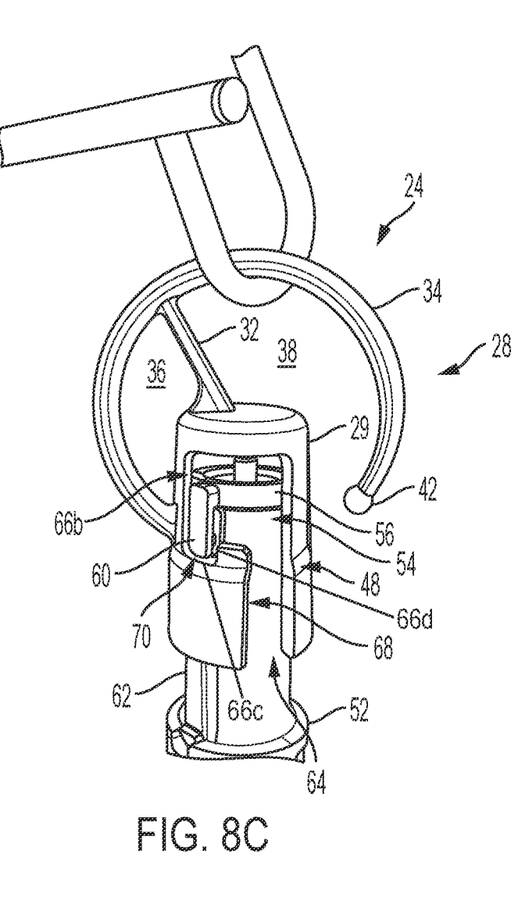
FIG. 8C is a perspective view of the long lug connector of FIG. 8A seated in a securing slot of the attachable hanger of FIG. 2.

As shown in FIGS. 8A-8C, shaft 52 can quickly and easily be coupled to attachable hanger 24. In an initial step, a user aligns long lug 60 with a receiving channel 64 before inserting shaft 52 into receiving cavity 46. As shaft 52 slides into receiving cavity 46, shaft lug 62 and long lug 60 respectively slide into and through receiving channel 64. The movement of shaft 52 into receiving cavity 46 is stopped once long lug 60 makes contact with an upper edge 66a of lug coupler 48. At this point, the user may rotate attachable hanger 24 and shaft 52 relative to one another until long lug 60 comes into contact with a lateral edge 66b of lug coupler 48. During this maneuver, shaft lug 62 slides underneath a tapered flange 68 of lug coupler 48. Finally, the user may then move shaft 52 and/or attachable hanger 24 such that long lug 60 slides into a securing slot 70. In this configuration, the position between attachable hanger 24 and shaft 52 is constrained due to contact between long lug 60 and securing slot 70. To decouple shaft 52 from attachable hanger 24, a user lifts long lug 60 out of securing slot 70, rotates shaft 52 and/or attachable hanger 24 until long lug 60 and shaft lug 62 are aligned with receiving channel 64, and then pulls shaft 52 out of receiving cavity 46. Lug coupler 48 further includes a lower edge 66c and another lateral edge 66d (FIG. 8C).

Figure 9:
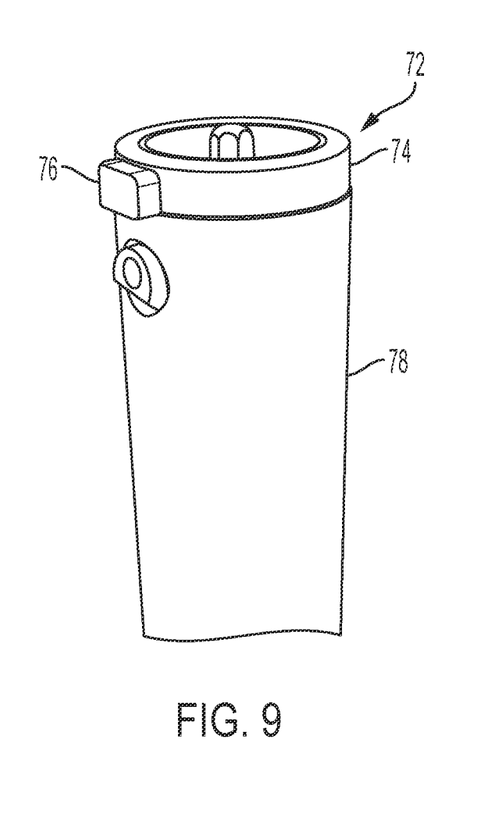
FIG. 9 is a perspective view of a short lug connector fixed to an end portion of an attachable shaft.

Other types of shaft connecting and alignment features may also be coupled to attachable hanger 24 as well. For example, a short lug connector 72 (FIGS. 12A-12D) may be coupled to attachable hanger 24 through a similar process as described above. Short lug connector 72 includes an annular end-ring 74 connected to a projection or a short lug 76. With reference to FIG. 9, a user will undergo the same steps to connect a shaft 78 with short lug connector 72 as was described above with reference to shaft 52 with long lug connector 54. One relatively inconsequential difference between the two scenarios is that no shaft lug that will slide underneath tapered flange 68.

Figure 13:
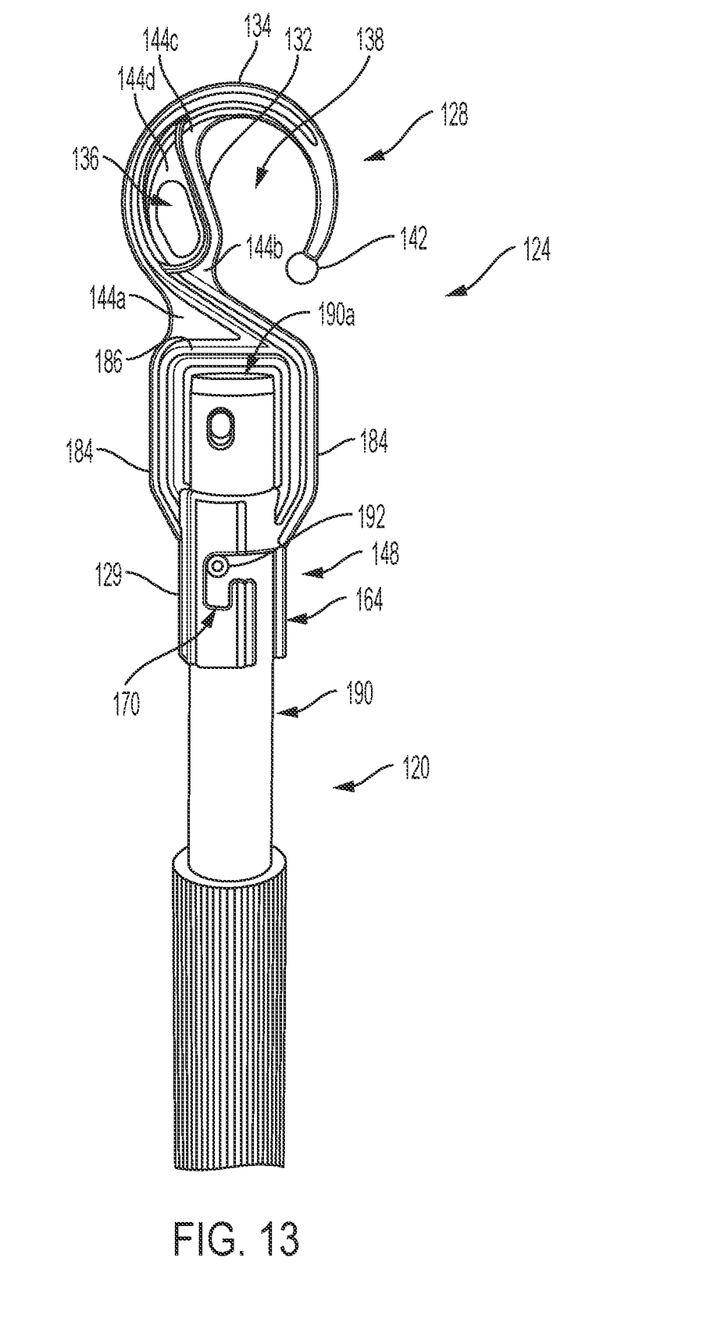
FIG. 13 is a front perspective view of another attachable hanger in accordance with the present invention in which the attachable hanger is shown attached to a functional attachment having attachment features located further from a shaft end portion.

Body 29 of attachable hanger 24 also defines coupler through-hole 50 opposite to lug coupler 48. (FIG. 7). Coupler through-hole 50 enables attachable hanger 24 to couple to shafts with projecting connectors, such as resilient member connectors and/or raised screw heads, such as shaft 80 with a projection in the form of a spring button 82 (FIGS. 10A and 10B) or a raised screw head (as shown at 192 in FIG. 13), for example. To couple shaft 80, or any other shaft with a similar resilient member connector, a user simply aligns spring button 82 with coupler through-hole 50 and slides shaft 80 into receiving cavity 46. Spring button 82 becomes depressed as it makes contact with and slides underneath body 29. As shaft 80 is slid further into receiving cavity 46, spring button 82 eventually reaches coupler through-hole 50. Upon reaching coupler through-hole 50, spring button 82 extends back out and through at least a portion of coupler through-hole 50, thereby fully constraining the position of shaft 80 relative to attachable hanger 24 until spring button 82 is manually depressed to allow shaft 80 to be removed from receiving cavity 46. It should be appreciated that an attachable hanger, such as attachable hanger 24, may also include an alignment slot defined by upper edge 66a for the purpose of maintaining alignment with a shaft, such as shaft 80, when a projecting connector, such as a resilient member in the form of a spring button 82 or a raised screw head 192, is unsecured from or otherwise moved out of securing slot 70. The alignment slot could be similar to alignment slots 194 and 294 described below with respect to alternative embodiments of an attachable hanger.

Figure 14A:
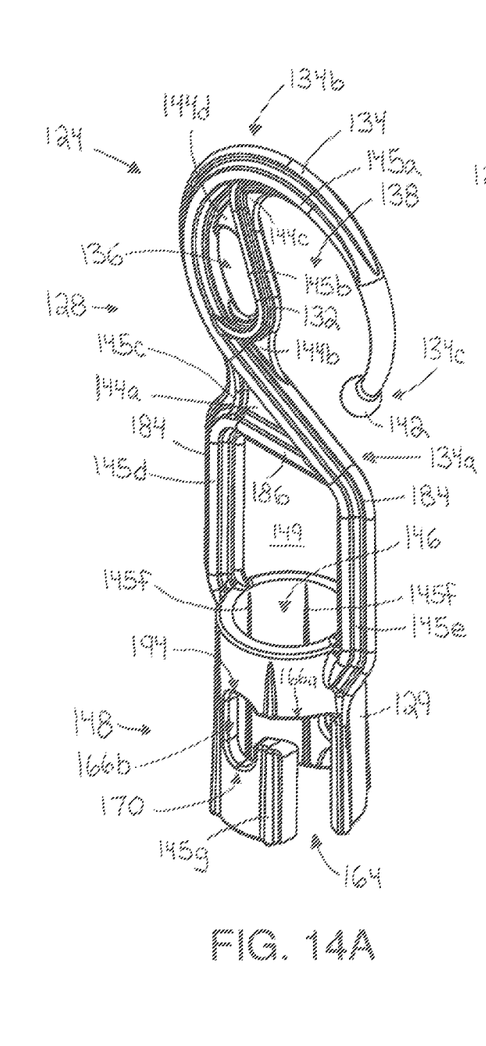
FIG. 14A is a perspective view of the attachable hanger of FIG. 13 shown in isolation.
Figure 14B:
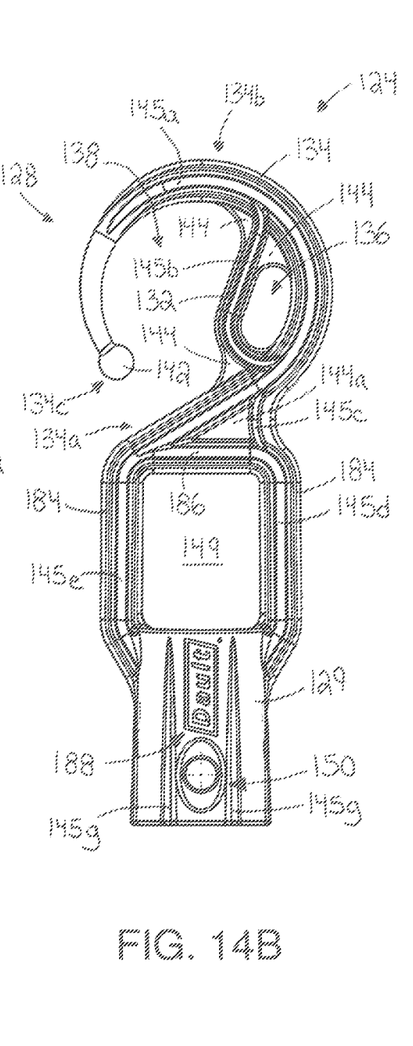
FIG. 14B is a front elevation view of the attachable hanger of FIG. 14A.
Figure 14C:
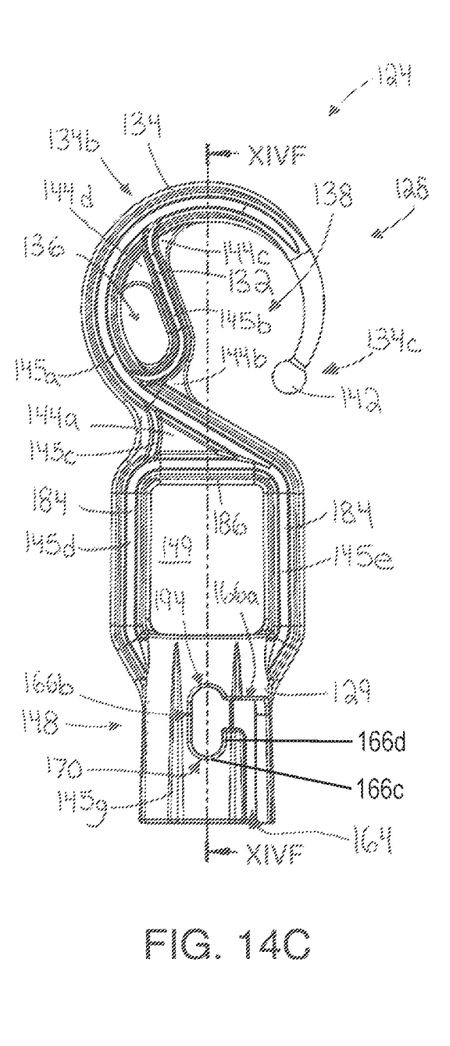
FIG. 14C is a rear elevation view of the attachable hanger of FIG. 14A.
Figure 14D:
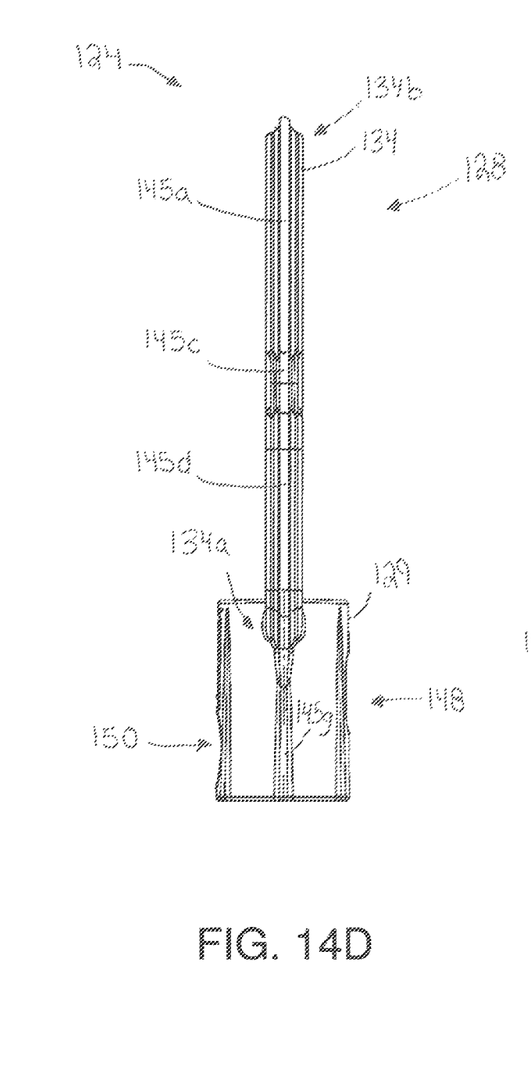
FIG. 14D is a right side elevation view of the attachable hanger of FIG. 14A.
Figure 14E:
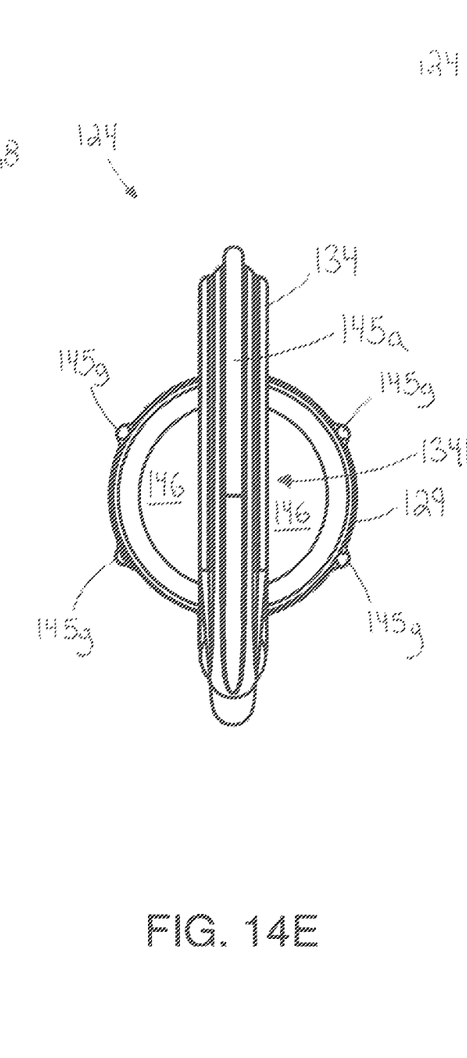
FIG. 14E is a top plan view of the attachable hanger of FIG. 14A.
Figure 14F:
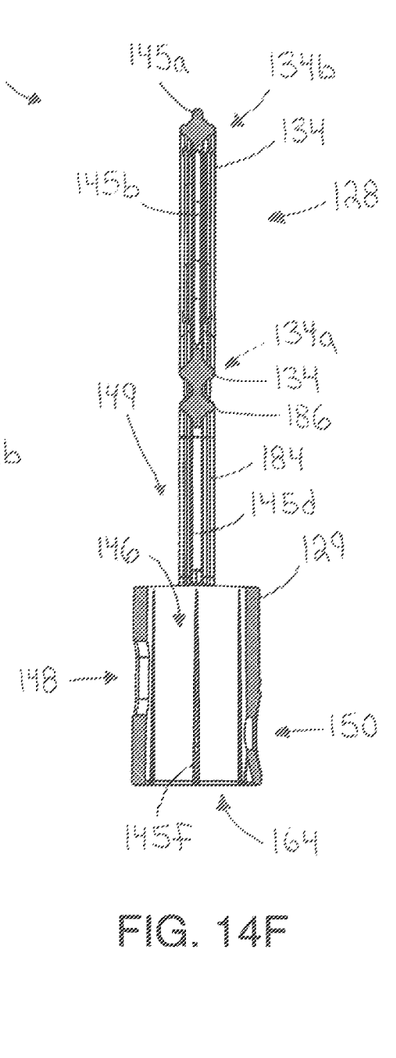
FIG. 14F is a cross-sectional view of the attachable hanger taken along the line XIVF-XIVF of FIG. 14C.
Figure 15A:
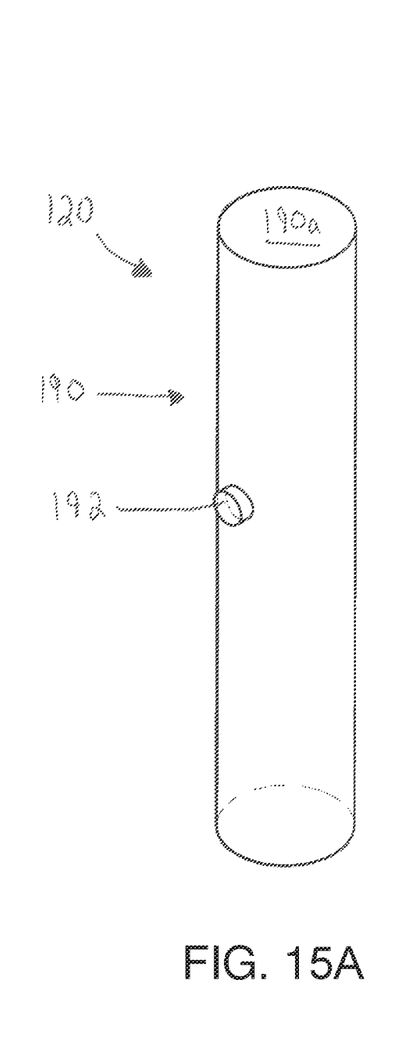
FIG. 15A is a perspective view of a portion of the functional attachment of FIG. 13 shown in isolation.
Figure 15B:
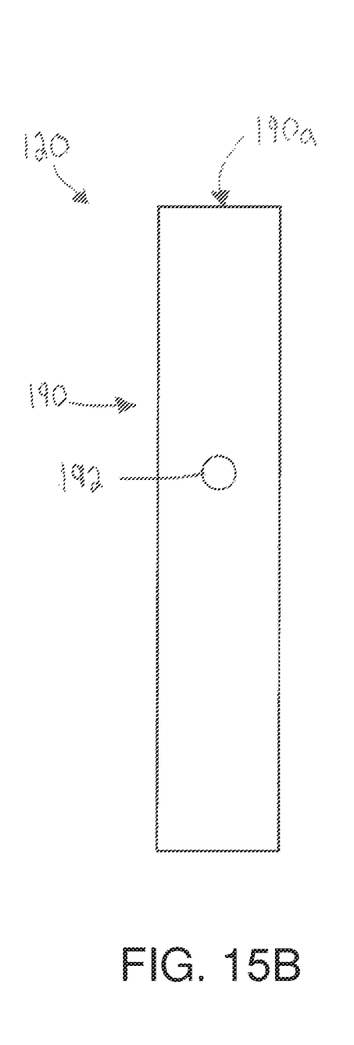
FIG. 15B is a front elevation view of the functional attachment of FIG. 15A.
Figure 15C:
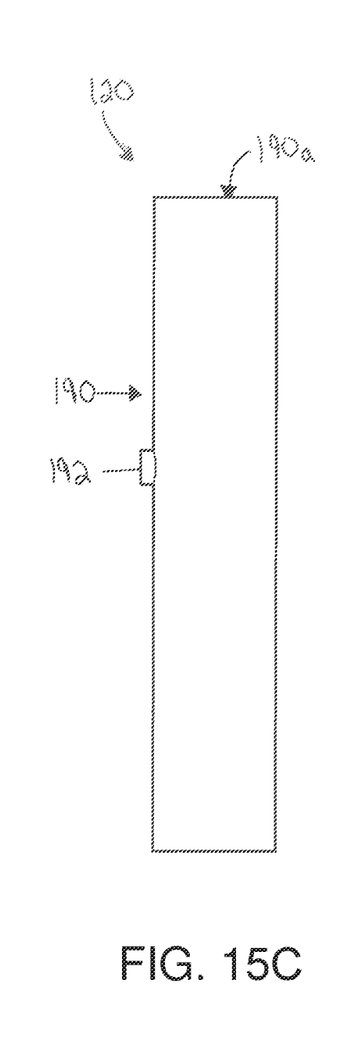
FIG. 15C is a right side elevation view of the functional attachment of FIG. 15A.
Figure 15D:
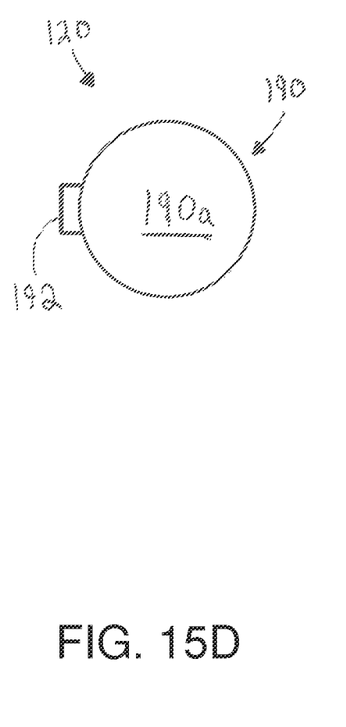
FIG. 15D is a top plan view of the functional attachment of FIG. 15A.

Referring now to the illustrated embodiment of FIG. 13 and FIGS. 14A-14F, another attachable equipment hanger 124 is shown that is similar to hanger 24, with similar features of hanger 124 relative to hanger 24 being designated with like reference numbers, but with "100" added to each reference number of hanger 124. Due to the similarities of hanger 124 relative to hanger 24, not all of the components and features of hanger 124 are discussed herein. As shown, hanger 124 has a body 129 that does not include an upper surface, such as upper surface 29*a* of attachable hanger 24. In this way, a receiving portion in the form of a through-hole 146 extends through body 129 in a vertical direction with hanger 124 thus having an opening, gap or clearance space 149 located beyond an end of the body 129 in the direction of a hanger portion 128. Attachable hanger 124 also includes a pair of vertically-extending extension arms 184 that are attached between body 129 and the hanging or hanger portion 128. Extension arms 184 increase the vertical distance between hanger portion 128 and body 129. A cross arm 186 connects upper ends of extension arms 184 together, and increases the structural strength of attachable hanger 124 by acting as a cross bracing between extension arms 184. Optionally, an ornamental design, text, and/or logo may be added to or defined by body 129, such as logo 188 (FIG. 14B). In addition, in like manner to hanger 24, equipment hanger 124 also includes a curved arm 134 that terminates in a bulge 142 and includes a proximal end 134*a*, a middle portion 134*b*, and a distal end 134*c*, a lug coupler 148 having an upper edge 166*a*, a lateral edge 166*b*, a securing slot 170, and a receiving channel 164, and a coupler hole 150. As shown in FIGS. 14A and 14C, an optional alignment slot 194 may be defined by upper edge 166*a*, where alignment slot 194 is adapted to receive a connecting and alignment feature such as a projection when hanger 124 is decoupled or removed from an elevated object, thus allowing hanger 124 to maintain a fixed alignment with a piece of equipment when hanger 124 is not being suspended or hung from an elevated object. Lug coupler 148 further includes a lower edge 166*c* and another lateral edge 166*d* (FIG. 14C).

Attachable hanger 124 also includes variations on similar features to the previously described attachable hanger 24. For example, like attachable hanger 24, attachable hanger 124 has a hanger portion 128 that includes curved arm 134 and an open hook portion 138. However, attachable hanger 124 has a curvilinear supportive arm 132 rather than a straight supportive arm. Supportive arm 132 is connected between two points on curved arm 134 to define a closed hook portion 136. Additionally, attachable hanger 124 includes a series of ribs 145*a-g* along many of its features, including along curved arm 134, supportive arm 132, extension arms 184, cross arm 186, and body 129. Attachable hanger 124 also includes various webbing features 144*a-d* to increase its structural integrity, including connecting web 144*a* that supports and strengthens the connection between extension arms 184 and hanger portion 128.

Figure 10A:
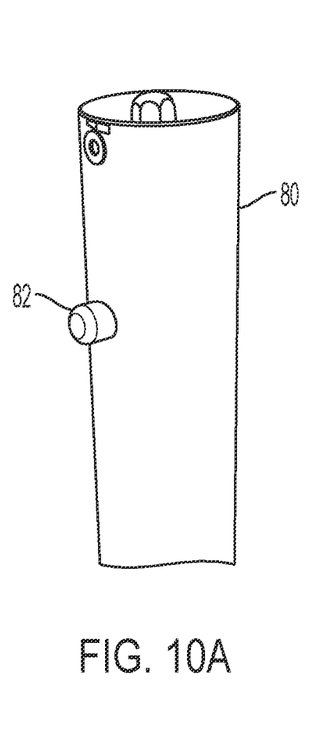
FIG. 10A is a perspective view of an end portion of an attachable shaft fitted with a spring button connector.
Figure 10B:
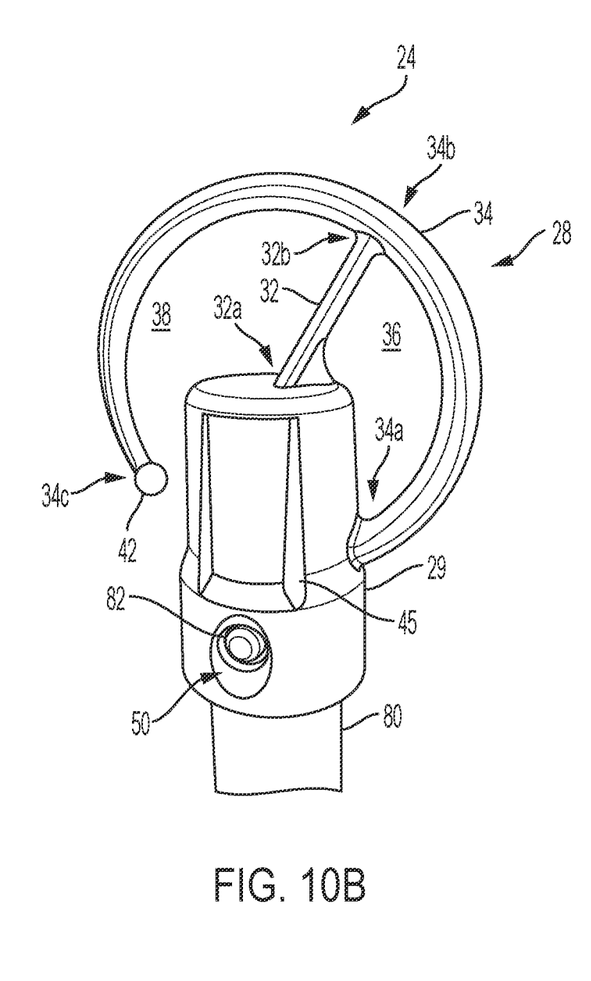
FIG. 10B is a perspective view of the spring button connector of FIG. 10A secured in a coupler through-hole of the attachable hanger of FIG. 2.
Figure 11A:
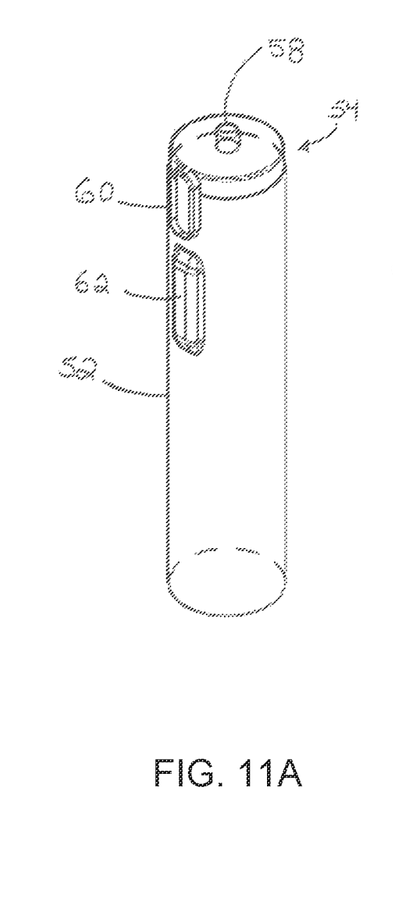
FIG. 11A is a perspective view of the long lug connector of FIG. 8A.
Figure 11B:
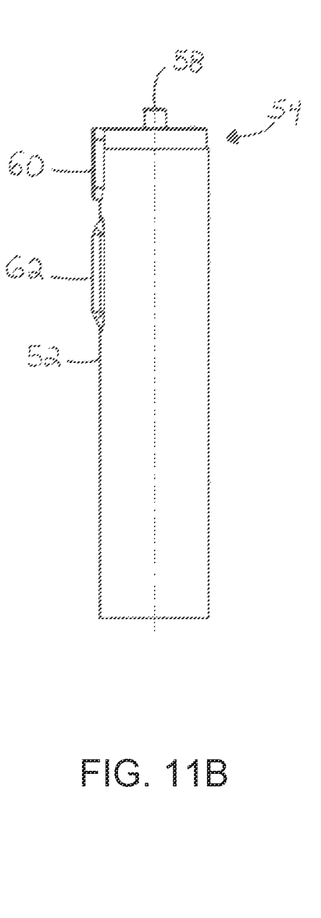
FIG. 11B is a side elevation view of the long lug connector of FIG. 8A.
Figure 11C:
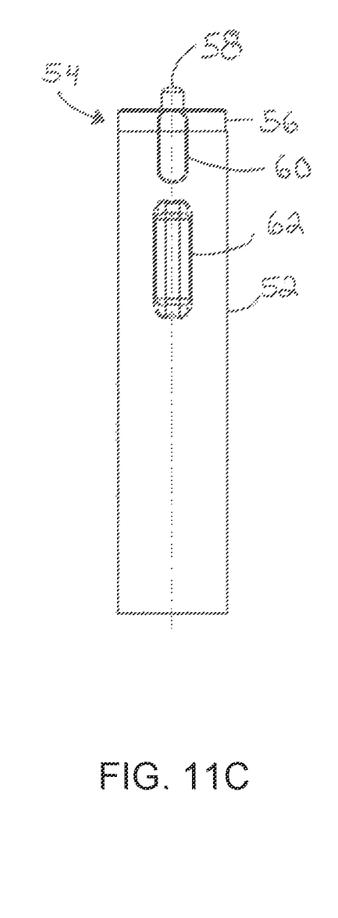
FIG. 11C is a rotated side elevation view of the long lug connector of FIG. 8A.
Figure 11D:
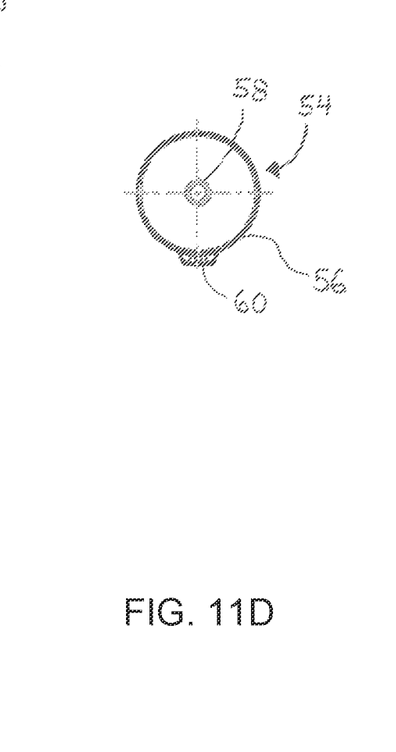
FIG. 11D is a top plan view of the long lug connector of FIG. 8A.
Figure 12A:
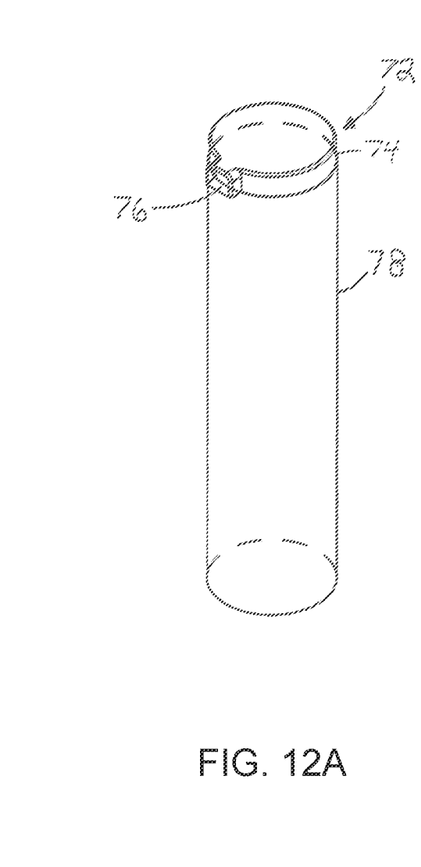
FIG. 12A is a perspective view of the short lug connector of FIG. 9.
Figure 12B:
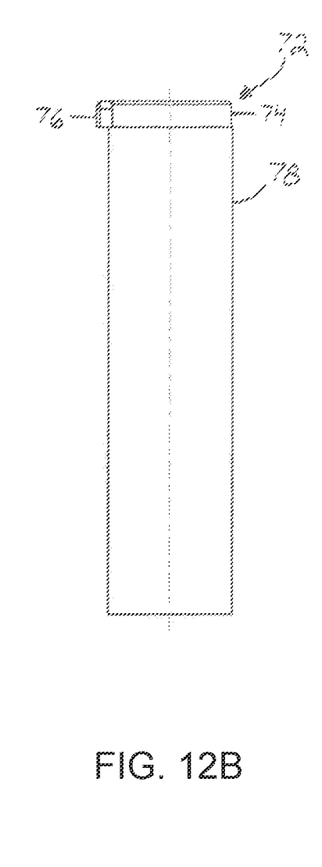
FIG. 12B is a side elevation view of the short lug connector of FIG. 9.
Figure 12C:
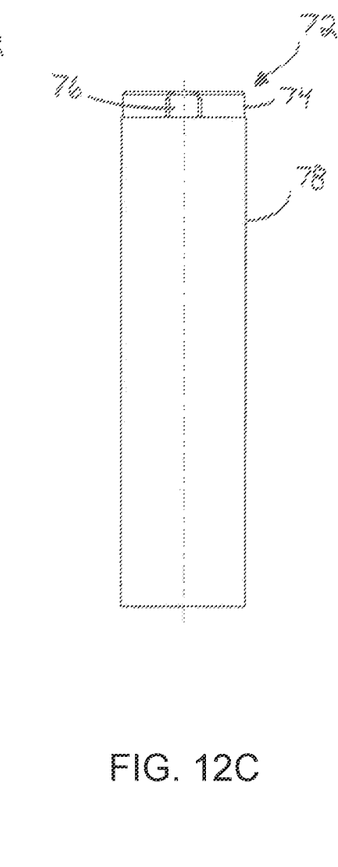
FIG. 12C is a rotated side elevation view of the short lug connector of FIG. 9.
Figure 12D:
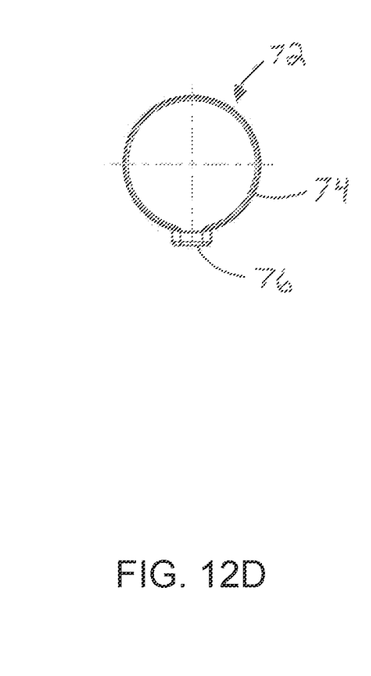
FIG. 12D is a top plan view of the short lug connector of FIG. 9.

The combination of extension arms 184 and through-hole 146 allow attachable hanger 124 to accommodate functional attachments having attachment features located further from an end or end surface of a functional attachment, where the functional attachment comprises a shaft component of lawn and garden equipment. For example, as shown in FIGS. 13 and 15A-15D, shaft 120 has an end portion 190 having an attachment feature or projection in the form of a threaded nut or screw 192 further from an end surface 190*a* of end portion 190 as compared to that of long lug connector 54 (FIGS. 11A-11D), short lug connector 72 (FIGS. 12A-12D), or button 82 on shaft 80 (FIGS. 10A-10B). Functional attachment 120 is able to be attached to attachable hanger 124 by first inserting end surface 190*a* into through-hole 146. End surface 190*a* may then be advanced further into through-hole 146 until it projects beyond the opening of hole 146 and into gap 149, and may make contact with cross arm 186 if necessary. A method similar to what has been described above with respect to connecting either long lug connector 54 or short lug connector 72 to attachable hanger 24 may then be used to secure screw 192 into securing slot 170 to thereby connect functional attachment 120 to attachable hanger 124.

Figure 16:
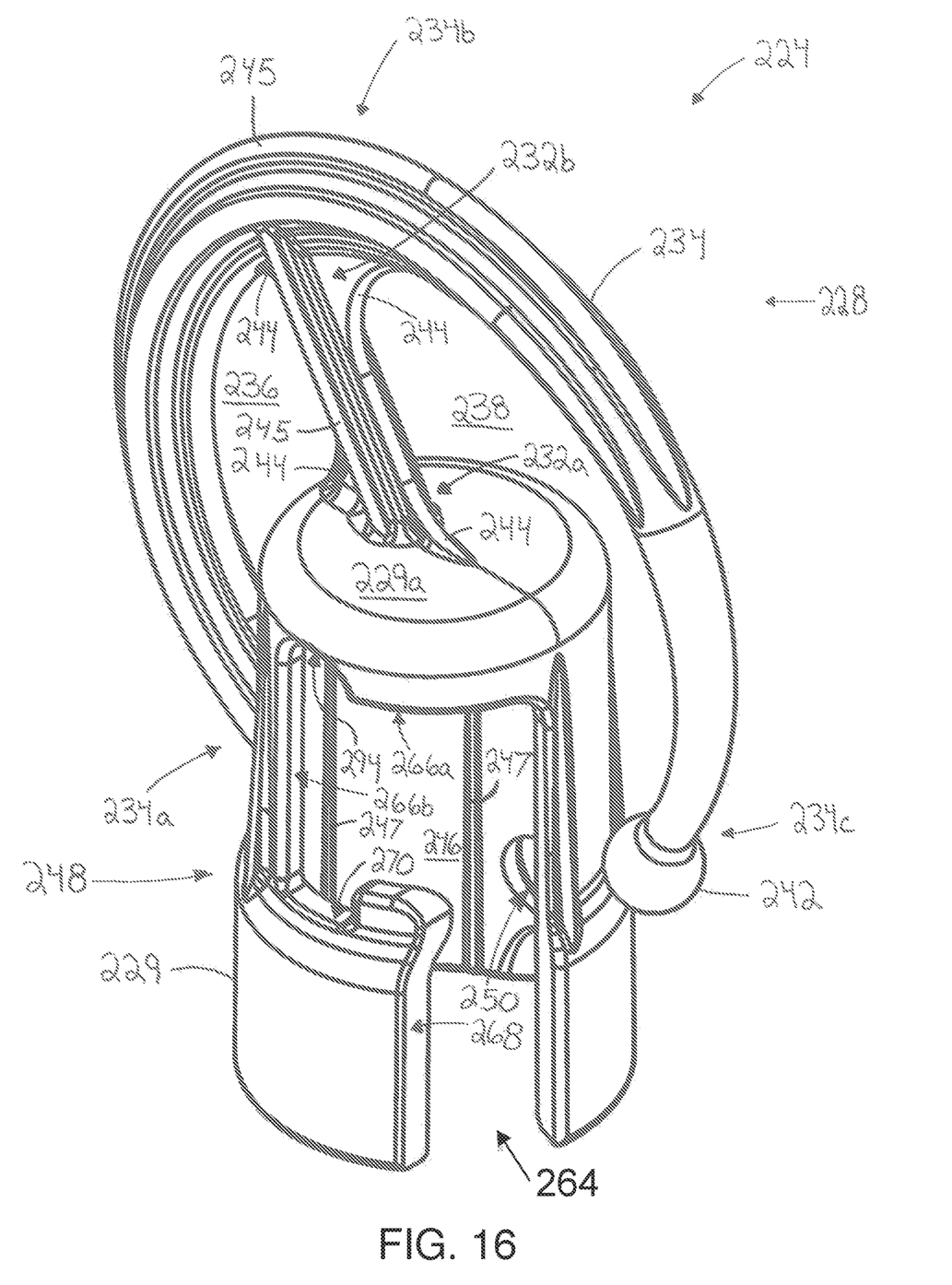
FIG. 16 is a perspective view of another attachable hanger in accordance with the present invention in which the attachable hanger includes an alignment slot.

Referring now to the illustrated embodiment of FIG. 16, another attachable equipment hanger 224 is shown that is similar to hanger 24, with similar features of hanger 224 relative to hanger 24 being designated with like reference numbers, but with "200" added to each reference number of hanger 224. Due to the similarities of hanger 224 relative to hanger 24, not all of the components and features of hanger 224 are discussed herein. As shown, hanger 224 has a body 229 that defines a lug coupler 248 having an alignment slot 294 located on an upper edge 266*a*. Alignment slot 294 is configured to receive an attachment feature, such as a lug, button, or screw, while an end portion of a functional attachment is located within a receiving cavity 246 and while attachable hanger 224 is not hanging or otherwise suspended from an object, such as a hook or rack, at an elevated location. In this configuration, gravity could force attachable hanger 224 downward relative to the functional attachment, thus resulting in the attachment feature making contact with upper edge 266*a*. When this occurs, the attachment feature could be received and secured within alignment slot 294, thus resulting in the substantially identical alignment between attachable hanger 224 and the functional attachment as compared to when attachable hanger 224 is in a hanging position and the attachment feature is secured in a securing slot 270. Therefore, the risk of inadvertent decoupling between attachable hanger 224 and the functional attachment is reduced while attachable hanger is not in a hanging position. Furthermore, when attachable hanger 224 is subsequently hanged, the attachment feature will slide directly down a lateral edge 266*b* and into securing slot 270, thereby eliminating the need to rotate attachable hanger 224 relative to the functional attachment to ensure the attachment feature becomes aligned and secured within securing slot 270. In addition, in like manner to hanger 24, equipment hanger 224 also includes a hanger portion 228 having a closed hook portion 236, an open hook portion 238, a straight arm 232 with a lower end 232*a* and an upper end 232*b*, and a curved arm 234 that terminates in a bulge 242 and that includes a proximal end 234*a*, a middle portion 234*b*, and a distal end 234*c*, a receiving channel 264, a tapered flange 268, a coupler hole 250, an upper surface 229*a*, a series of webbings 244, and a series of ribs 245 and internal ribs 247.

It will be appreciated that an attachable hanger within the scope of the present invention can be coupled to any suitable portion of a piece of equipment with sufficient connective features. The end portion of a shaft and connective features described herein are for illustrative purposes only. It will also be understood that the characteristics of the coupling portion of an attachable hanger may vary. For example, a lug coupler may not have a receiving channel, or have a receiving channel with bends or curves to further reduce inadvertent decoupling between an attachable hanger and a piece of equipment. Additionally, a securing slot may be longer, wider, or have additional bends in it to further secure a coupled piece of equipment. Furthermore, the size, shape, and position of a coupling through-hole may vary within the scope of the present invention.

It will also be appreciated that a hanger portion may have varying characteristics while remaining within the scope of the present invention. For example, a pivoting latch could be used to secure an attachable hanger to an elevated object.

Additionally, an alternative hanger portion may have additional open and/or closed portions or only a single open or closed portion. Furthermore, alternative forms of straight arm 32 and curved arm 34 could have additional curves, ridges, and/or bumps, or include only straight portions with no curves at all.

Accordingly, the attachable hanger of the present invention provides an easy and effective way to safely and conveniently store equipment that is not in use. A hanger portion with open and closed hook portions provide a user with flexibility when deciding how to best suspend the attachable hanger from a hook, rail, or other object fixed at an elevated location. A coupling portion with a lug coupler and a coupling through-hole allows the attachable hanger to securely couple to a wide variety of different types of connecting and alignment features already present on various pieces of equipment, such as a lug connector or spring button on an end portion of a weed trimmer attachment.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. An attachable hanger for hanging a piece of equipment, said attachable hanger comprising:
   a body defining a receiving cavity and having a coupling receptacle in a sidewall of said body, with said coupling receptacle having a plurality of edges defining an opening in said sidewall of said body, said receiving cavity configured to selectively receive an end portion of a shaft of the piece of equipment, with said coupling receptacle configured to selectively receive a projection from the shaft for retaining the attachable hanger to the shaft; and
   a hanger portion connected to said body and configured to be selectively hooked to an elevated object;
   wherein said coupling receptacle comprises a securing slot comprising a lower edge and a pair of lateral edges configured to receive the projection to selectively hold the piece of equipment when said hanger portion is hooked to the elevated object, and wherein said securing slot is configured to receive the projection after the projection has been slid into said coupling receptacle through an open end of said body in an insertion direction and has been subsequently rotated into alignment with said securing slot and moved in a direction opposite to the insertion direction for engaging the projection with the securing slot.

2. The attachable hanger of claim 1, further comprising a receiving channel extending from the open-end of said body to the coupling receptacle, and wherein the receiving channel is configured to receive the projection when inserted into the open-end of said body and slid into said coupling receptacle.

3. The attachable hanger of claim 2, wherein the receiving channel opens into the coupling receptacle at a location along an axial length of said body that is further from the open-end of said body than is the securing slot.

4. The attachable hanger of claim 2, wherein the receiving channel defines an opening in said sidewall of said body.

5. The attachable hanger of claim 1, wherein said body includes an upper surface disposed over the receiving cavity opposite the open-end of said body.

6. The attachable hanger of claim 1, wherein the hanger portion is disposed at an opposite end of said body from the open-end of said body.

7. The attachable hanger of claim 6, wherein the hanger portion comprises a curved arm.

8. The attachable hanger of claim 6, wherein the hanger portion defines a plane that bisects said receiving cavity.

9. The attachable hanger of claim 6, wherein the hanger portion is attached to an upper surface of said body.

10. The attachable hanger of claim 6, wherein the hanger portion defines a closed hook portion.

11. The attachable hanger of claim 1, wherein the securing slot has a rectangular profile.

12. The attachable hanger of claim 1, wherein the securing slot has a semi-circular profile.

13. An attachable hanger for hanging a piece of equipment, said attachable hanger comprising:
   a body defining a receiving cavity and having a coupling receptacle in a sidewall of said body, with said coupling receptacle defining an opening in said sidewall of said body, said receiving cavity configured to selectively receive an end portion of a shaft of the piece of equipment, with said coupling receptacle configured to selectively receive a projection from the shaft for retaining the attachable hanger to the shaft; and
   a hanger portion connected to said body and configured to be selectively hooked to an elevated object;
   wherein said coupling receptacle comprises a securing slot configured to receive the projection to selectively hold the piece of equipment when said hanger portion is hooked to the elevated object, and wherein said securing slot is configured to receive the projection after the projection has been slid into said coupling receptacle through an open end of said body in an insertion direction and has been subsequently rotated into alignment and moved into engagement with said securing slot, and wherein when the projection is received in the securing slot said body is prevented from rotating relative to the shaft.

14. The attachable hanger of claim 13, wherein the projection is slid into the coupling receptacle by moving the shaft into the receiving cavity in an insertion direction, and wherein the projection engages the securing slot by being moved in a direction opposite the insertion direction when rotated into alignment with the securing slot.

15. The attachable hanger of claim 13, further comprising a receiving channel extending from the open-end of said body to the coupling receptacle, and wherein the receiving channel is configured to receive the projection when inserted into the open-end of said body and slid into said coupling receptacle.

16. The attachable hanger of claim 15, wherein the receiving channel opens into the coupling receptacle at a location along an axial length of said body that is further from the open-end of said body than is the securing slot.

17. The attachable hanger of claim 15, wherein the receiving channel defines an opening in said sidewall of said body.

18. The attachable hanger of claim 13, wherein the hanger portion is disposed at an opposite end of said body from the open-end of said body.

19. The attachable hanger of claim 18, wherein the hanger portion defines a plane that bisects said receiving cavity.

20. The attachable hanger of claim 18 wherein said body includes an upper surface disposed over the receiving cavity opposite the open-end of said body, and wherein the hanger portion is attached to the upper surface of said body.

21. The attachable hanger of claim 13, wherein the hanger portion defines a closed hook portion.

22. The attachable hanger of claim 13, wherein the hanger portion comprises a curved arm.

23. The attachable hanger of claim 13, wherein the securing slot has either a rectangular profile or a semi-circular profile.

\* \* \* \* \*